US007062733B1

(12) United States Patent
Poskatcheev et al.

(10) Patent No.: US 7,062,733 B1
(45) Date of Patent: Jun. 13, 2006

(54) METHOD AND APPARATUS FOR DELAY LINE CALIBRATION

(75) Inventors: Andrei Poskatcheev, Palo Alto, CA (US); Tom Helmer, San Jose, CA (US); Rob Verity, Menlo Park, CA (US)

(73) Assignee: SyntheSys Research, Inc., Menlo Park, CA (US)

( * ) Notice: Subject to any disclaimer, the term of this patent is extended or adjusted under 35 U.S.C. 154(b) by 10 days.

(21) Appl. No.: 10/098,246

(22) Filed: Mar. 15, 2002

(51) Int. Cl.
*G06F 17/50* (2006.01)

(52) U.S. Cl. .............................................. 716/6; 716/5

(58) Field of Classification Search .................... 716/1, 716/4–6, 7, 18; 327/12, 295, 160, 161, 1, 327/91; 703/4, 6, 13, 14; 718/1–6, 18
See application file for complete search history.

(56) References Cited

U.S. PATENT DOCUMENTS 5,825,673 A * 10/1998 Watanabe .................... 703/14
5,973,523 A * 10/1999 Kusumoto et al. .......... 327/146
6,209,122 B1 * 3/2001 Jyu et al. ........................ 716/6
6,429,693 B1 * 8/2002 Staszewski et al. ........... 327/12
6,470,483 B1 * 10/2002 Rodriguez et al. ............. 716/6
6,496,043 B1 * 12/2002 Moss et al. ................... 327/12
6,587,185 B1 * 7/2003 Ide et al. ................... 356/5.01
2002/0104065 A1 * 8/2002 Tsukiyama et al. ............ 716/6
2003/0131222 A1 * 7/2003 Thomas ......................... 713/1

* cited by examiner

*Primary Examiner*—Vuthe Siek
*Assistant Examiner*—Binh Tat
(74) *Attorney, Agent, or Firm*—John Carpenter; Reed Smith, LLP

(57) ABSTRACT

Sub-sampled signals are compared to determine time delay, calibration of delay elements, and other precise time domain measurements, based on properties of aliased signals produced by the sub-sampling. In one embodiment, flip-flops sub-sample an input signal and a delayed signal. A counter measures time delay between edges in the sub-sampled input and sub-sampled delayed signal. The time delay is determined and averaged over a measurement window, and then scaled to determine an amount of delay of the delayed signal. Means to calibrate a delay element inside a measurement device (e.g., Bit Error Ratio Tester), utilizing sub-sampling techniques to achieve precise measurements very quickly and without the need for factory calibration.

36 Claims, 8 Drawing Sheets

METHOD AND APPARATUS FOR DELAY LINE CALIBRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to calibration of electronic devices. The invention is more particularly related to the calibration of delay lines or elements, particularly for use in test equipment or other devices in which precision time domain measurements are performed.

2. Discussion of Background

Typically, test instruments require calibration of delay lines done at the factory. The calibration is a test configuration that would provide stimulus and measure results on an oscilloscope, then a software program would create translations from the results to math functions that map the actual delay performance to desired performance. These mappings might take into account operational frequency, system operating temperature and other factors that effect performance. These mappings ultimately result in very complicated relationships that are based on assumptions about the behavior of the circuits. These usually produce some result that is stored in a memory on the instrument. Updates or changes to this result usually require that the instrument be shipped back to the factory for re-calibration. Also, variances in temperature and aging effects on components result in inaccuracies in the performance of the delay line functions in the test instrument.

SUMMARY OF THE INVENTION

The present inventors have realized the need to make to make fast and accurate time delay measurements. The present invention provides a device that can be fitted internally to an piece of electronic equipment that makes fast and accurate time delay measurements.

In another embodiment, the present invention is a delay measurement device, comprising, a first measurement device configured to measure make a first sub-sampled measurement of an input signal, a second measurement device configured to make a second sub-sampled measurement of the input signal delayed by a delay line, and a calculator coupled to each of the first and second measurement devices and configured to calculate an amount of delay of the delay line based on a phase shift of the delayed input signal compared to the input signal.

The present invention includes a method of determining an amount of delay in a delay line, comprising the steps of taking a first sub-sampled measurement of an input signal, taking a second sub-sampled measurement of the input signal delayed by the delay line, and calculating the amount of delay based on a phase shift of the delayed input signal compared to the input signal. The steps of taking first sub-sampled and second sub-sampled measurements are performed at a sliding frequency comprising a sub-sampling frequency offset from a frequency of the signal.

The step of calculating an amount of delay comprises timing a phase shift delay between an edge of the input signal and a corresponding edge in the delayed input signal, accumulating the phase shift delay between subsequent sub-sampled edges in the input signal and corresponding sub-sampled edges in the delayed input signal, and averaging the phase shift delay accumulated during a measurement window.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have realized the need to make accurate time delay measurements in a short period of time, and to use measurements as an integral part of electronic instrument calibration. It allows for integral electronic instrument calibration, calibration can be performed during normal use of the test instrument, and the effects of temperature, component aging, sensitivity to operational frequency, power changes, and other effects, can all be accounted for, producing a substantially more accurate instrument.

The present invention utilizes sub-sampling or undersampling of a test signal and a delayed signal, and the subsamples from each signal are evaluated to determine phase delay between the signals. The phase delay is then used to calculate the amount of delay in a delay line causing the delayed signal to be delayed.

In the ideal case, sub-sampling or undersampling of a carrier signal (e.g. a test signal) loses the carrier frequency information of the signal but does not loose any of the modulation information of the signal. The present invention takes advantage of this when modulation does not extend out from the carrier by more than half the sampling frequency. A signal within X % of the basic sample rate gives about 100/x samples/cycle on an aliased (sub-sampled) signal. A cycle being defined as the number of sub-samples required before a same phase position of the carrier (or test) signal is re-sampled. Thus, a signal having 1% frequency offset would yield 100 samples per cycle. It is also worthy to note that for an ideal time-domain alias, the time related features on the alias scale by the ratio of the repetition frequency of the original waveform. For a repetitive time domain signal, ideal positive undersampling does not materially change the shape of the signal, provided an adequate number of sample points can be obtained. These theories are applied to circuits constructed in a manner to produce time delay measurements based on a sub-sampled alias of a test signal or other repetitive waveform. The repetitive waveform is a clock signal generated inside an instrument to be calibrated.

Figure 1:
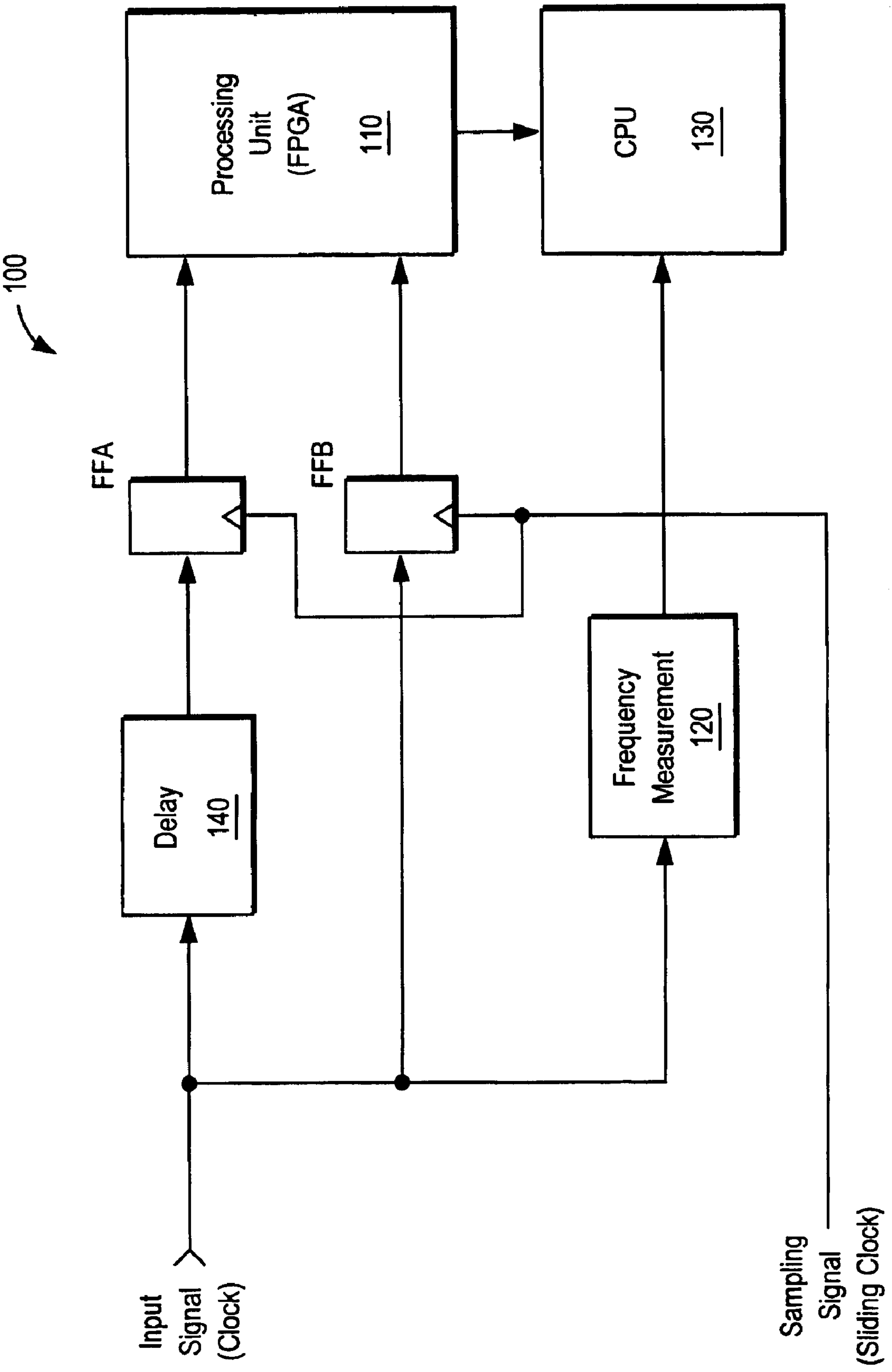
FIG. 1 is a block diagram of overall delay line measurement system according to an embodiment of the present invention.

Referring now to the drawings, wherein like reference numerals designate identical or corresponding parts, and more particularly to FIG. 1 thereof, there is illustrated a block diagram of an embodiment of the present invention. A sub-=sampled system 100 contains a delay element, two sampling flip flops FFA and FFB), a processing unit 110, a frequency measurement device 120 and a central processing unit or CPU 130. A delay element 140 receives an input signal at some frequency, a clock signal, (perhaps from clock source) and the input signal is then sampled before and after delay element 140 with the two identified flip flops. The flip flops are clocked with a sliding frequency clock, where "sliding frequency" means a clock signal which is sub-sampling the input signal. This sliding frequency clock signal (sub-sampling frequency) is about 1/10 of the input frequency (under sampling) but not an exact divider. It is approximately 1/10 the input signal frequency+an offset. The offset is, for example, 1/10 the input signal frequency*(99/100). The offset is one of the requirements of the aforementioned sub-sampling theory, and keeps the sub-samples from repeating the same phase measurements thereby extending the cycle. The sampled outputs of the flip flops are aliased signals FFA providing an alias of the delayed input signal and FFB providing an alias of the input signal. The shift or time between the two flip flops (or aliased signals) represents phase shift caused by the delay element. The processing unit will measure this shift and create a phase calculation. Given the input frequency, measured by the frequency measurement circuit 120 it is possible to produce the delay measurement.

The input clock waveform and the same signal shifted, as a result of passing through the delay line is sampled by the "sliding frequency" clock and samples the waveform at slightly different points each time, thus producing an equivalent of scanning the wave form at an offset of the +1% interval. A 1% offset is preferred, but other offsets may be readily substituted. The resolution of the aliased signals depends on the difference in frequency between the sampling clock ("sliding frequency") and the sampled signal ("input waveform"). This resolution is about 100 samples/period if done at a 1/10 rate, and −1% frequency offset. The frequency offset is continuously applied and after 100 samples the sampling clock will come back to the original phase, completing a cycle. The measurements made occur over 1 cycle or N cycles. This process is a linear one such that the same phase delay in the high frequency signals are present as in low frequency sub-sampled signals. The time delay is calculated by determination of phase shift and a circuit which measures the input signal frequency. The final calculation in performed in CPU by software.

The processing unit is a logic device which measures and averages the phase shift between the two flip flops. It also provides a measurement window over which the phase shift accumulation is to be performed. The size of the measurement window is determined by length of time desired to obtain results, jitter in input signal will affect it (more averaging reduces the effects of jitter in input signal, hence a larger measurement window has that advantage). Time to complete calibration will affect it, a faster calibration time can be obtained with a smaller measurement window.

The measurement window interval is based upon identification of a measurement window size. The measurement window request is a request asserted by the CPU or other controller (e.g. processing unit 110), and includes a window size that is sampled by the "sliding clock". An actual measurement window is not initiated until the processing unit detects an edge (e.g., rising edge) on FFA (or FFB) utilizing the sampling clock. The measurement will then start on these boundary conditions. The measurement stops in a similar manner (synchronized on a flip-flop rising edge and the sampling clock). This guarantees that the measurements will contain integer number of "sliding clock" cycles.

An arithmetic logic unit provides a count of how many samples occur between the arrival of the positive edge of the undelayed flip flop and the positive edge of the delayed flip flop. This is done by subtracting the count position of the delayed edge from the count position of the undelayed edge.

Figure 2:
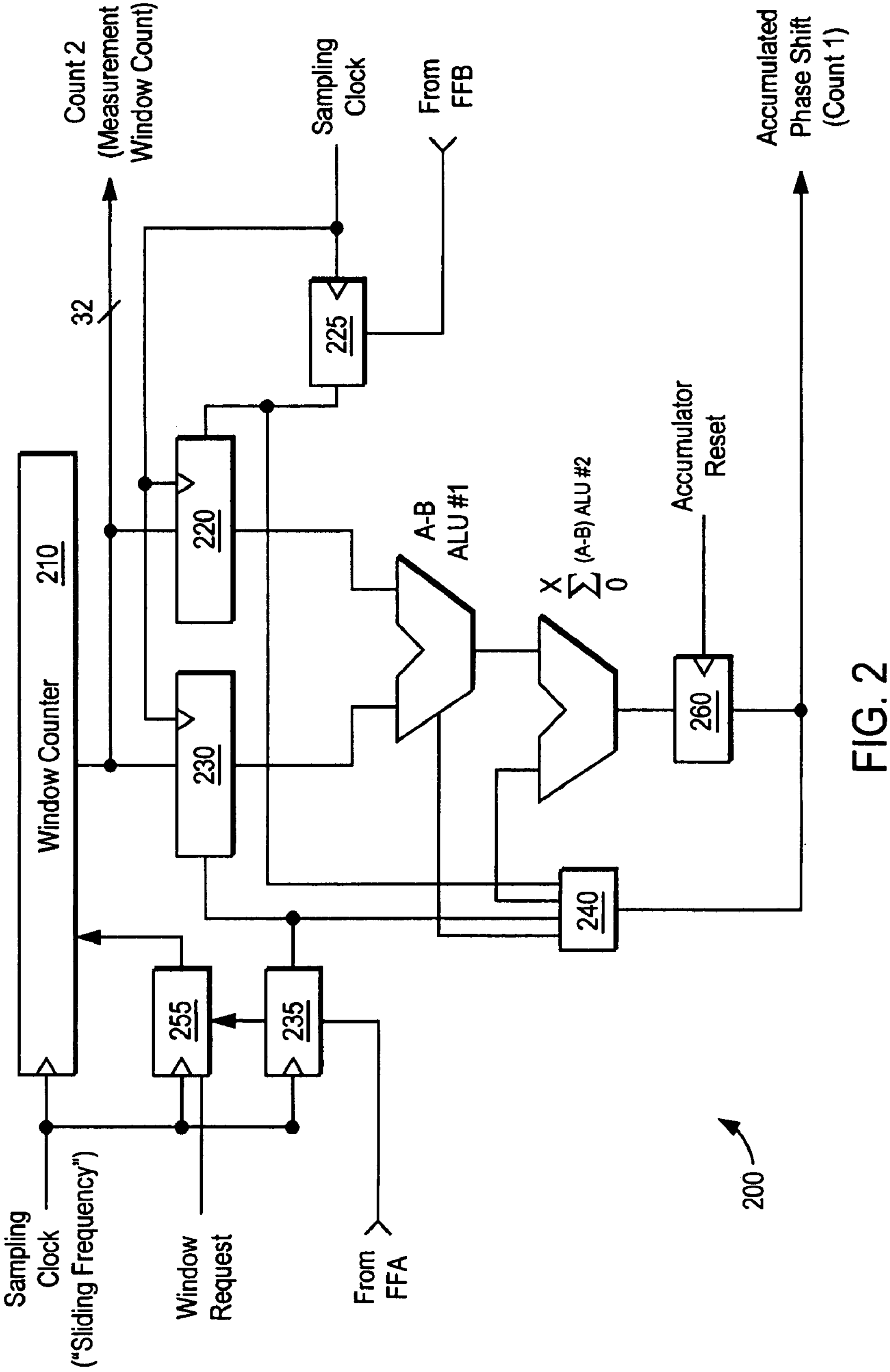
FIG. 2 is a block diagram of processing unit according to an embodiment of the present invention.

FIG. 2 is a block diagram of a processing unit 200 according to an embodiment of the present invention. In FIG. 2, the components of the processing unit 200 are illustrated. The measurement is accumulated over the window, which is, for example, say N sample clocks of the sampling signal ("sliding frequency"). A window counter 210 is incremented with each sample clock over the measurement window. The phase shift of the two flip flops is computed by first storing a value of the window counter at register 220 at the occurrence of the rising edge of the undelayed flip flop. When the rising edge of the delayed flip flop occurs a second value of the current window counter is stored in register 230. The values in the two registers are then subtracted to produce the difference in time, measured by sample clock periods between occurrence of corresponding rising edges occurring at the two flip flops. This phase shift is then accumulated over the window.

The subtraction of the count values is done by ALU #1 (e.g., A–B in FIG. 2) and the accumulation is done by ALU #2. Typically, the present invention expects to be detecting the A and B signals in a manner that produces positive results (e.g., if A is the leading edge of the undelayed signal, then A is detected first, B is a larger value and the ALU#1 operation is then B–A). However, it can be the case that when the delay intervals are small, it could be that at some time these flip flops reverse roles and a negative result occurs. This is detected by a signed arithmetic logic circuit (e.g., provided in accumulator control and sign correction block 240), and a polarity correction is applied to the accumulated sum. An accumulator control and sign correction block 240 also receives the FFA and FFB signals from the corresponding FFA and FFB de-glitching circuits 225 and 235. The accumulator control portion uses the FFA and FFB signals to trigger accumulation of ALU#1 output in ALU#2.

Register 260 provides a register for storing the result of ALU#2 and synchronizes the result with the sampling clock. An accumulator reset is connected to a control device (e.g., Processing unit 110, or CPU 130). The control device then resets the register 260 before a measurement request is made.

A window enable block 255 is utilized to implement the window size. The CPU 130 (or other logic, e.g., processing unit 110) asserts a window request line that signals the window enable block to synchronize the start of the window with an edge of FFA (from FFA de-glitching circuit 235) and the sampling clock. Alternatively, the window is synchronized to an edge of FFB and the sampling clock. On the synchronization, the window enable block enables the window counter 210 which begins counting over the window size (while window request is asserted) to produce a window count. At the end of the window, the CPU de-asserts the window request and the window enable block disables the window counter 210 at synchronization of a similar edge from the same flip-flop and the sampling clock. This guarantees that the measurements will contain integer number of "sliding clock" cycles.

Figure 3:
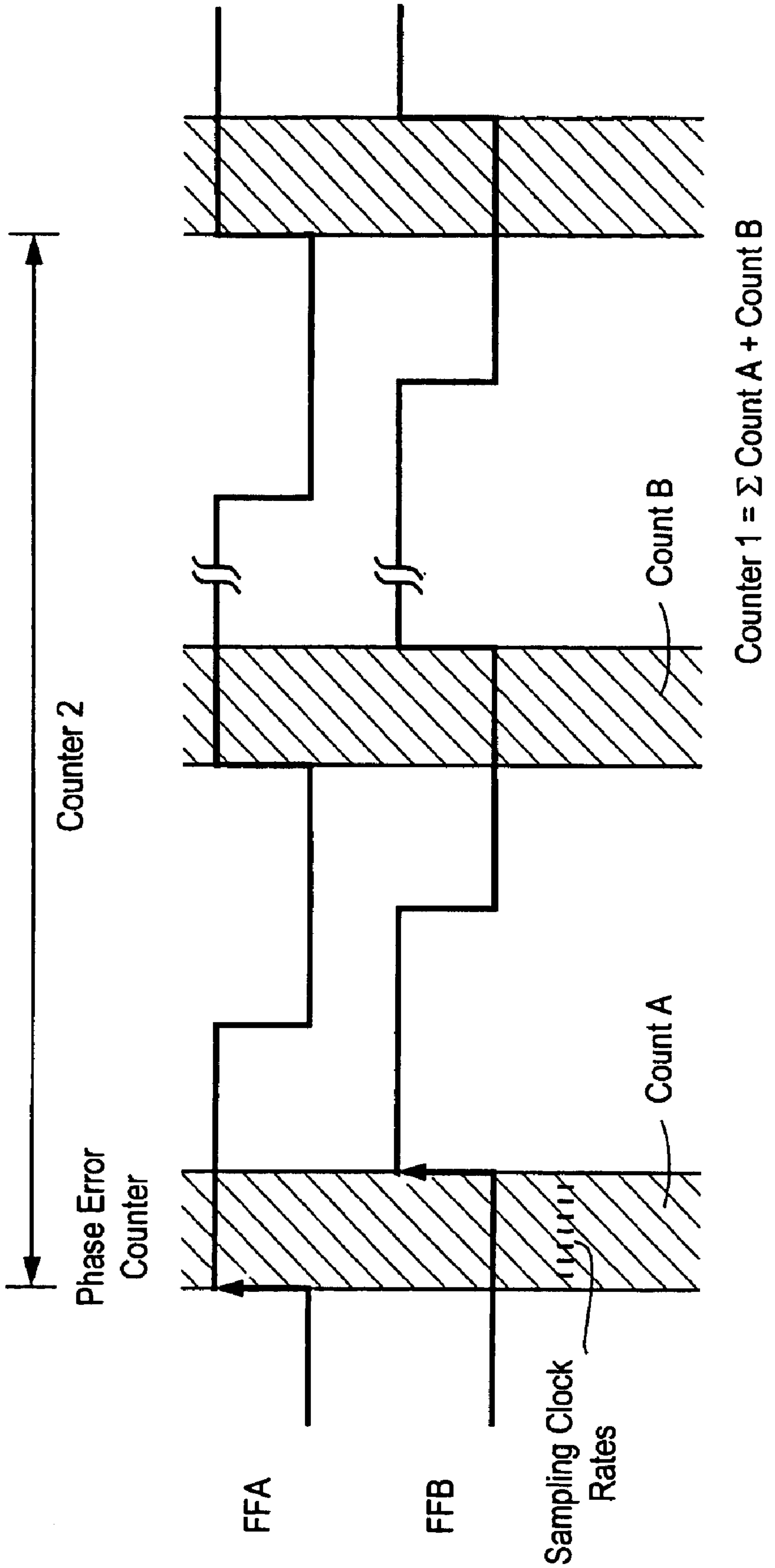
FIG. 3 is a timing diagram that illustrates Processing Unit Calculations according to an embodiment of the present invention.

FIG. 3 is a timing diagram that illustrates Processing Unit Calculations according to an embodiment of the present invention. In FIG. 3, a phase shift between the signal captured by FFA and the signal captured by FFB is measured by the number of sampling clock ticks (ticks of the sampling signal of the "sliding clock," e.g., count A, count B) between corresponding edges of the FFA and FFB signals. Either a rising edge or falling edge signal may be utilized, and the phase shift may be positive or negative, either case being worked out as mentioned above using polarity correction. Count A and Count B are individual counts of the phase shift and correspond to the calculation performed by ALU#1 in FIG. 2. The total phase shift (accumulated phase shift) is the sum of all individual phase shift counts that occur during the measurement window and correspond to the calculation performed by ALU#2 in FIG. 2. The measurement window itself has a period that comprises a count of sampling clock ticks shown as count 2 over the measurement window.

Since the circuits are sampling flip flops asynchronously, which is used to produce a signal edge for each sampling flip-flop (e.g., FFA and FFB), there may be a situation where metastability or other noise sources cause glitches on the outputs of the flip flops. These outputs must be processed to remove any unwanted edges. Referring back to FIG. 2, a de-glitching circuit is used on both flip flop outputs (de-glitching circuit 225 for FFB, and de-glitching circuit 235 for FFA) to reduce any error introduced by these unwanted artifacts. The de-glitching circuits are identified in the block diagram of FIG. 2. If the "sliding frequency" chosen to sample the flip flop is 1% higher in frequency then we have 100 samples per period of the aliased signal. Averaging the samples helps improve the measurement accuracy.

The accumulated phase shift, denoted Count1, and the window count, denoted Count2, are passed on to the CPU for calculation of the delay. The processing unit has logic that will generate a measurement gate that is an integer number of sample clock periods. The delay period (DP) is defined as the ratio of the 2 counters (Count1/Count2) multiplied by the period of the input frequency ($f_i$). The period of the input signal is measured by a frequency measurement device).

$$DP=(\text{Count1}/\text{Count2})f$$

Recall that in FIG. 1, a frequency counter is used to measure the full rate input clock frequency. This is used in the time delay calculation and also provides feedback as to proper settings for the "sliding frequency" for the sub-sampling circuits. So, as an example, say the input clock frequency is 1.6 Gb/s with a 666 ps period ($T_i$). If the systems was programmed to return a window count measurement of about 10,000 samples, then this would take about 66 us to complete measurement of the delay period (DP).

The delay period is scaled to determine the line delay. The formula is $$\text{scale}=1/(\text{window count size})*T_i$$

Using the sliding clock period, which is typically approximately 1/10 the input clock period or in this example would be 6.66 ns times the window count size or 10,000. If the processing unit accumulated 1phase shift count in this window, then the resulting delay measurement would be scaled as 1/10000*666 ps or 666 fs. This is an example of the type of accuracy that can be achieved using this approach. Actual experiments performed by the inventors have reached 200 femto second accuracy (0.002 nanoseconds).

Figure 4:
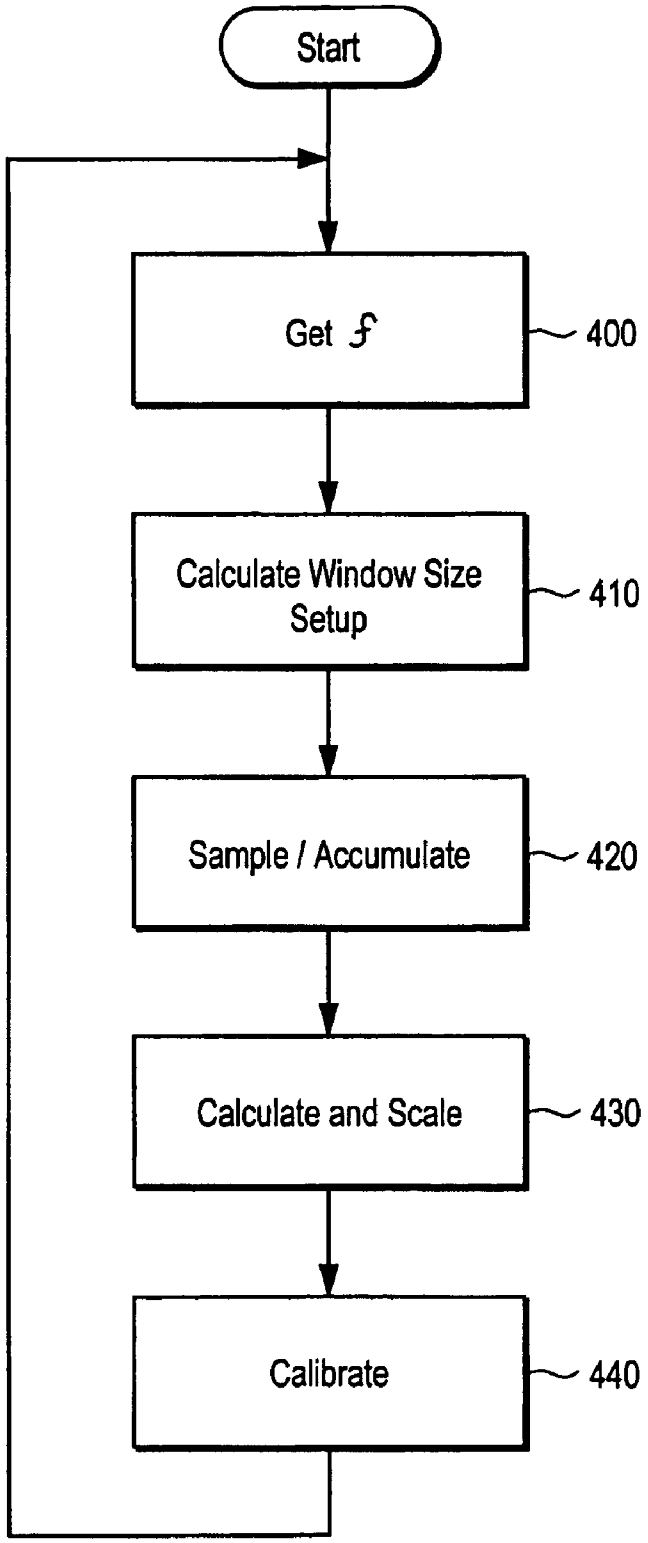
FIG. 4 is a flow chart of a process for determining delay according to an embodiment of the present invention.

FIG. 4 is a flow chart of a process for determining delay according to an embodiment of the present invention. At step 400, a frequency of an input signal is determined. The frequency is measured by a frequency measurement device (e.g., freq. measurement device 120). Alternatively, the frequency may be provided by a value stored in memory, either a set location in memory or from a look up table, spreadsheet, or other data array in which the frequency is correlated to another item. in yet another alternative, the frequency may be input by a user via a keyed entry, or other user interface (e.g., GUI, text prompt, etc.).

The input signal frequency is then used to calculate a window size request and corresponding sample rate (step 410). The window size is set to facilitate the correct number of samples per measurement period (per measurement window). The sampling rate may be set according to a fractional portion of the input waveform plus an offset as described above. The fractional portion of the input waveform and offset may be a set value, or otherwise programmed, and/or input or selected by the user.

At step 420, samples according to the fractional portion of the input waveform and offset are taken and accumulated. The samples are taken using flip-flops or other sampling techniques known in the art. The offset may either increase or decrease the phase of subsequent samples. Preferably, the samples are taken as discussed according to the selected fractional portion of the waveform and offset, but other selection schemes may be utilized so long as a complete cycle of samples are taken. The number of samples per cycle will ultimately depend on the accuracy needed in the delay line measurements. As noted above, the present inventors have determined accuracy measured in fento seconds based on 10,000 sample measurement window. Accumulation of the samples is an accumulation of a total amount of delay between corresponding edges of the input signal and a delayed signal over the measurement window or cycle.

At step 430, using the frequency, accumulated sub-sampled phase delay, and measurement window parameters, a phase delay between the sub-sampled input signal and the sub-sampled delayed signal is calculated. The phase delay is then scaled to the actual phase delay.

The instrument utilizing the delayed signal is then calibrated using the scaled phase delay/time delay (step 440). The process is repeated either periodically, continuously, on demand, or as triggered by an internal of external event.

There are however several challenges that present themselves to achieve such a goal. Some of these are sampling errors in the flip flops, as these are not ideal devices, some error will be introduced, crosstalk between the clock and data inside the flip-flops can also introduce error into these measurements. This is possible due to the fact that the data input (full rate clock) can shift the sampling point of the clock (sub-sampling clock) input.

When the input frequency is low, it will take longer to make a measurement. In the above example, if the input frequency was 100 times lower, say 16 Mhz, then the measurement time would increase to 66 ms. It may be desirable to keep measurement periods short even though the input frequency might be low.

Although the present invention is mainly described with reference to the components illustrated in FIG. 1, other components having similar functionality may be readily substituted as will be apparent to one of ordinary skill in the art upon review of the present disclosure. For example, Delay element 140 may be any electronic component, circuit, or wire that delays the input signal. Flip flops are illustrated for sampling the input and delayed signal and they me readily substituted with other types of latches or detection devices. The Processing unit is preferably and FPGA, but may be implemented in other types of circuits or combined with the CPU if the CPU has sufficient processing power, speed, etc. Alternatives to the FPGA and/or CPU include Application Specific Integrated Circuit (ASIC) devices, Discrete Logic Devices arranged to perform similar functionality. In yet another alternative commercial test, instruments may be similarly arranged (e.g., Frequency Counters and Time Interval Analyzers connected to a computer programmed according to the processes discussed herein.

Figure 5:
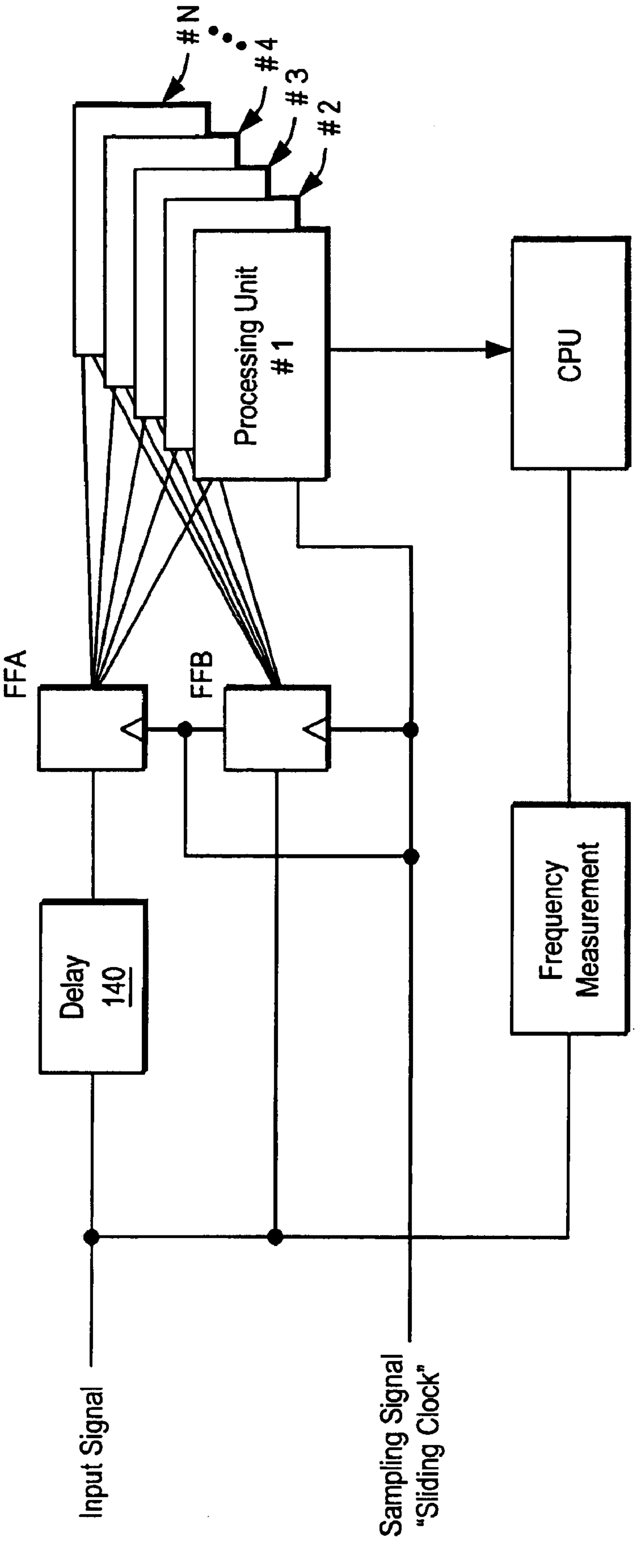
FIG. 5 is a block diagram of Multi-Channel derivative system according to an embodiment of the present invention.

Another derivative of the main invention is an alternative approach to perform the undersampling with the addition of a multi-channel approach. FIG. 5 is a block diagram of Multi-Channel derivative system according to an embodiment of the present invention. In FIG. 5, In this configuration, we have an arrangement of components similar to that shown in FIG. 1, except that we have multiple processing units (processing units #1, #2, #3, #4, . . . , #N). Each processing unit is fed by the outputs of FFA and FFB. Functionally, each of the processing units perform similar to that shown in FIG. 2, except that they each process the samples at different fixed phase offsets. For example, FPGA #1 is set up to process phase offsets that at a certain phase position. FPGA #2 is set up to process phase offsets at a phase position offset by a fractional share of phase corresponding to the number of FPGAs utilized, and each additional FPGA is further similarly offset. This approach then allows for interleaving of sampling clocks that can produce delay measurements independently and in parallel. So, for example, if you have 4 sampling clocks then you need four sets of hardware, and can improve the measurement time by a factor of 4. This will speed up the measurement time for low frequency signals, and there is no limit to the number of interleaved circuits, except for practicality in circuit size and power consumption.

In other words, when it is desired to obtain measurements faster for low frequency input signals, but not very low input frequencies, a multi-channel approach is utilized. This will consist of determining a sliding clock frequency and then multiplying that frequency by M, where M is the number of processing units. There are multiple FPGA units that are logically identical but each unit is "assigned" an edge of the sliding clock. Each processing unit only processes 1/M clock edges. The determination of which edge to process can be constructed in the FPGA. The multiplication has the effect of producing more positive clock edges at phase offsets. In the case which M is set to 2, there becomes two positive edges in the time frame that had only one (M=1) and is offset by half a sampling clock period. This produces two samples in one (M=1) sampling clock period. The sample produced from the even clock cycles should go to and be processed by FPGA 1 and the samples produced by the odd clock cycle should go to and be processed by FPGA2. Thus each FPGA processes the same number of samples within the measurement window request but because there are two of them it can be done it half the time.

Figure 6:
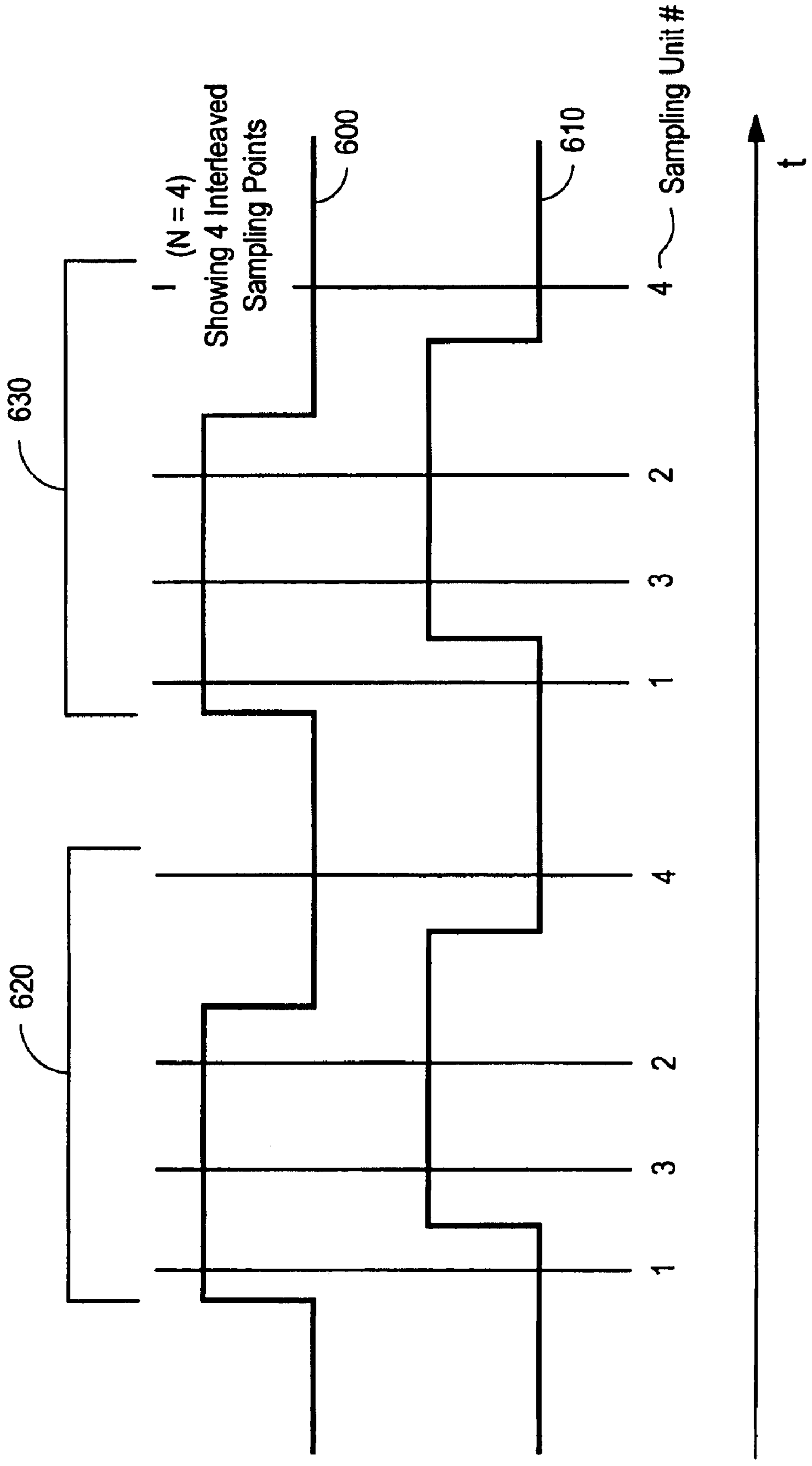
FIG. 6 is a timing diagram that illustrates Processing Unit Calculations (Multi-Channel) according to an embodiment of the present invention.

FIG. 6 is a timing diagram that illustrates Processing Unit Calculation points (Multi-Channel) according to an embodiment of the present invention. FIG. 6 illustrates an input signal 600 and a delayed signal 610. The signals are sampled at point 1, 2, 3, and 4, each sampling point corresponding to one of 4 processing units and are illustrated in subsequent sets of the 4 sampling points identified by 620 and 630 on the waveform. Processing unit #1 is sampling a portion of the waveform between sampling point #1 (620) and sampling point #3 (620), starting at sampling point #1 (620) and progressing (an amount of progression with each sample is determined based on the size of the offset) toward point #3 (620). In sampling set 620, each of the sampling points have progressed an amount equivalent to the offset. Processing unit #2 samples a portion of the waveform between sampling point #2 (620) and sampling point #4 (620). Processing unit #3 samples a portion of the waveform between sampling point #3 (620) and sampling point #2 (620), and Processing unit #4 samples a portion of the waveform between sampling point #4 (620) and sampling point #1 (620). Interleaving of the processing units provides the advantage of speeding up the time delay measurement.

In yet another embodiment of the present invention, oversampling is used when clock frequencies are really low, say down in the 1 Mhz range. Now the sliding frequency will not be 100× of the sampled input signal. If the input signal is 1 Mhz and sliding clock is programmed for 99 Mhz. Now we have the case where there exists, as in the undersampled case, about 100 samples/period. Now the processing unit can use the same method in the to determine delay in the undersampled case. However, in other cases where the frequency is low, but not so low as to make oversampling the best choice, multi-channel oversampling may be the best choice for measurement.

Figure 7A:
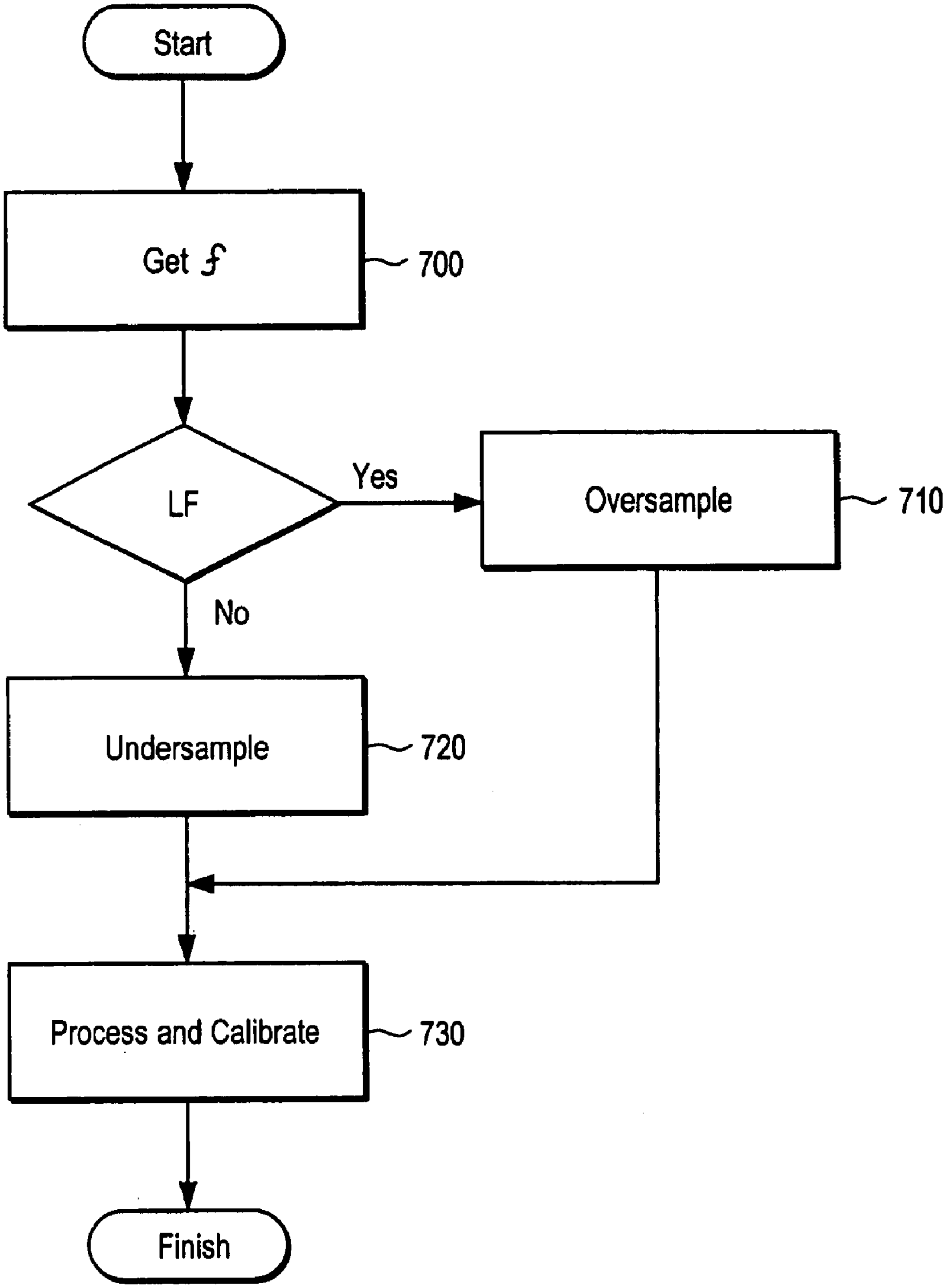
FIG. 7A is a flow chart illustrating a set-up process for a single channel embodiment of the present invention.
Figure 7B:
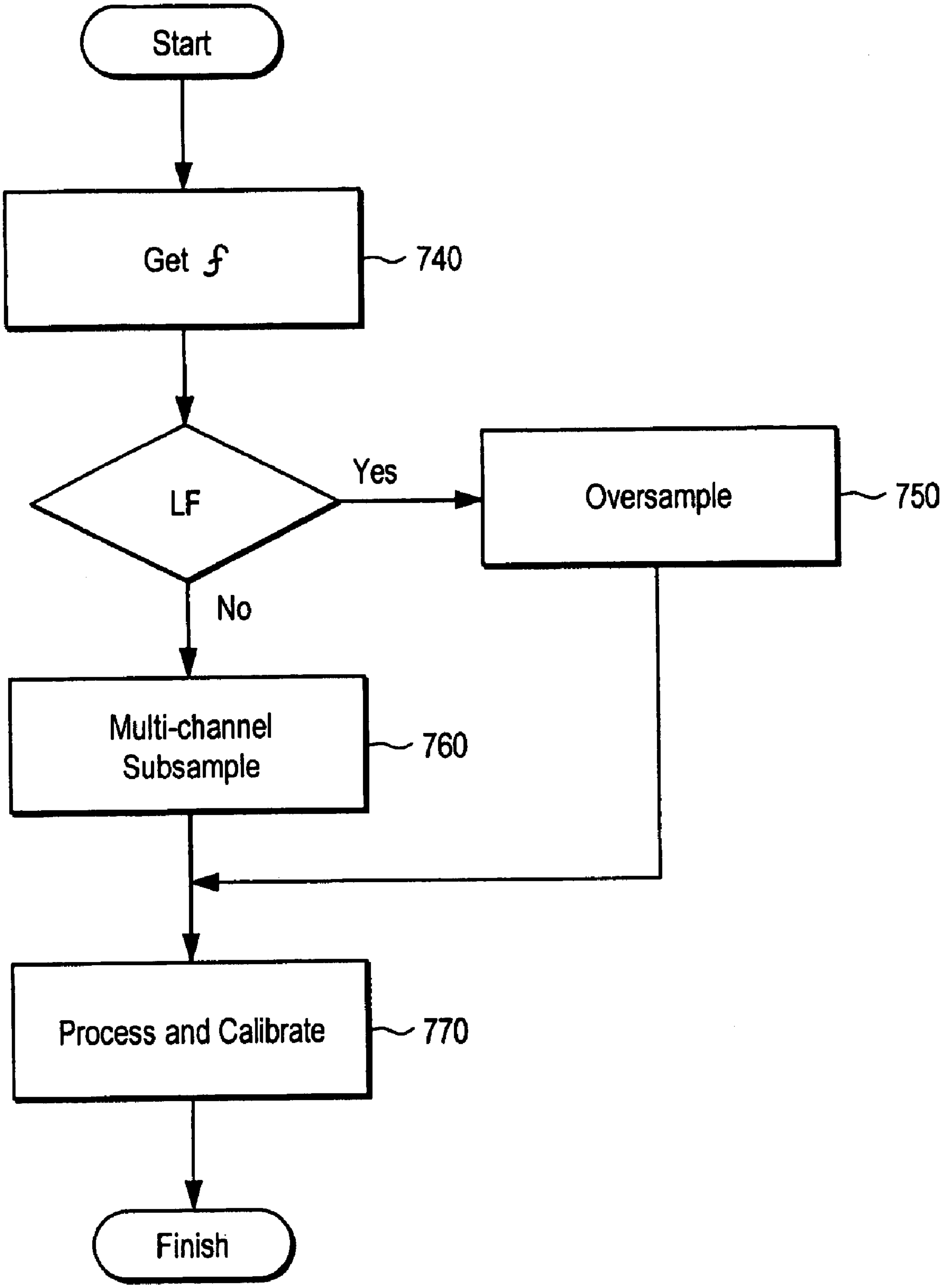
FIG. 7B is a flow chart illustrating a set-up for a multi-channel embodiment of the present invention.

The invention includes logic and/or programming to set up hardware and/or software functions in a device to implement various sample rates (over-sampling/under-sampling), measurement window sizes, etc. FIG. 7A is an example of a set-up process according to a single channel embodiment of the present invention. At step 700, a frequency of the input signal is determined. If the frequency is a low frequency signal, then, the device is set up for oversampling (step 710), otherwise, the device is set-up for undersampling (step 720). After set-up, the device proceeds to process the samples and calibrate any other hardware that relies on the amount of delay measured by the samples. FIG. 7B is an example of a set-up process according to a multi-channel embodiment of the present invention. The set-up changes in that multi-channel sampling is the process used for higher frequencies.

Portions of the present invention have been described with reference to high frequency and low frequencies (e.g. when establishing whether to oversample or subsample). In the context of the present invention, the definition of a high frequency or a low frequency is dependent upon the precision of components utilized to build the invention. With current state-of-the-art technology, that precision is well suited to the measurement of delay lines carrying signals at over 10 GHz frequencies, a range where conventional state-of-the-art over-sampling techniques have great difficulty in operating. However, with these same current state-of-the-art components, the present invention reaches well above 10 GHz (reaching close to 40 GHz in some experiments) without problems. Thus, within the context of the present invention, the HF/LF dividing line is not a set line but instead dependent on the components. However, that being said, using current state-of-the-art components, HF is generally in the 1 GHz and above range, and LF generally refers to any fractional part of a GHz. However, any such limits or constraints are imposed only by the precision of the components and not the design of the invention. With increased quality of components, which is to be expected considering past technological growth and improvements in this area, there is no limit on the frequencies at which the present invention is capable of operating.

The invention works best for signals that are repetitive patterns (clock type signal). PRN patterns might with a known bit period of the input signal may also be utilized. For PRN, the samples are reviewed for next edge +/−T*N (T=period). By knowing the bit edge transitions it is possible to identify the PRN pulses and perform necessary logic to determine the same type of data as the continuous clock case. Therefore, based on the present disclosure, it should be understood that the present invention is not limited to only periodic waveforms, but can be extended to PRN data as well. Generally speaking, any waveform with edges or other features from which delay measurements can be based may be utilized.

SyntheSys Research, Inc. manufactures Bit Error Rate Testing Equipment which typically employ a delay element on the transmit path and the receive path. These two delay lines have a requirement to get calibrated, minimally at the factory, and in the field, each of which make it an ideal platform in which to implement the present invention. These delay line technologies require very good accuracy in their application in a Bit Error Rate Testing device, and the invention provides the means to obtain the desired accuracy quickly, efficiently, and transparently to the user.

In one embodiment, the invention is to be implemented in the BA1500 Bit Error Rate Analyzer product. Thus, the BA1500 will not require factory calibration for insuring delay line performance. In addition, productivity of the testing process during manufacturing will increase as this initial calibration performed at the SyntheSys Research Inc. factory is performed very quickly. The reduced costs to produce the unit allows for higher profit margins on shipped systems. The product will also benefit from the fact that the instrument will be continuously calibrating itself compensating for any temperature changes, or frequency dependencies in the instrument. This gives the customer a more accurate instrument during every power on hour.

Thus, the present invention solves the problem of making accurate time delay measurements in a short period of time. The present invention allows for the calibration and measurement of a delay line as an integral part of a test instrument. It allows for this calibration to be done quickly and accurately during normal use of the test instrument. The present invention allows the instrument to calibrate itself to a very high degree of accuracy at any time. So the effects of temperature, component aging, sensitivity to operational frequency, power changes, and other effects, can all be calibrated out, producing a substantially more accurate test instrument. In addition, this makes the instrument much more available as it no longer is required to be shipped back the factory for calibration confirmation or adjustment.

Another key element of the invention is the fact that these delay measurements can be done quickly, and therefore labor costs to perform the default factory calibration is very small. This can be a significant effort based on existing methods. The gathering and processing of data for various delay components over frequency, temperature etc, can take a significant amount of man-hours. This penalty is a reduction in product margin as these expenses in labor can become quite significant. Also due to the length of time to perform these calibrations, the volume of product is limited. To overcome this many companies might implement multiple calibration workstations with the necessary capitol equipment needed, and simply bear the expense of these additional workstations. This invention allows for extreme efficiency in the factory calibration station so that no significant “extra” capital equipment is needed to complete the process and since it is very quick, a fraction of the man-hours is needed. Thus, this invention saves money in production, and increases profit margin of whatever product it is used in.

Other instruments also suffer from inaccuracies in non-monotonic behavior. This method will allow for improvement in accuracy insuring monotonic behavior. Current technologies implemented in state of the art products still exhibit this problem. This invention will eliminate this unwanted behavior in any instrument employing this technology. This invention utilizes some properties of sub-sampling theory to achieve this objective.

Although the present invention has been described herein with reference to calibrating delay lines, the devices and processes of the present invention may be applied to other calibrations, particularly any measurement comparing a waveform to be tested relative to a reference waveform. Therefore, the invention is ideally suited for measurements in electrical and optic based circuits.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Accordingly, all described components, including, but not limited to flip flops, FPGAs, processing units, CPU’s, and frequency measurement devices, etc. should also be consider in light of any and all available equivalents.

Furthermore, the inventors recognize that newly developed technologies not now know may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating sampling rates, determining frequencies of input signals, calculating measurement window sizes, triggering oversampled and/or undersampled measurements of signals, calculating delays, scaling delays, calibrating an instrument or a measurement, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States:

1. A method of determining an amount of delay in a delay line, comprising the steps of:

taking a first sub-sampled measurement at an under-sample frequency of an input signal;

taking a second sub-sampled measurement at an under-sample frequency of the input signal delayed by the delay line; and calculating the amount of delay based on a phase shift of the delayed input signal compared to the input signal.

2. The method according to claim 1, wherein said steps of taking a first sub-sampled measurement and taking a second sub-sampled measurement are performed simultaneously.

3. The method according to claim 1, wherein said steps of taking first sub-sampled and second sub-sampled measurements are performed at a sliding frequency comprising a sub-sampling frequency offset from a frequency of the signal.

4. The method according to claim 3, wherein the sliding frequency comprises a fraction of the frequency of the signal minus the offset.

5. The method according to claim 3, wherein the sliding frequency comprises a fraction of the frequency of the signal plus the offset.

6. The method according to claim 4, wherein the sliding frequency comprises a rate 1/10th of the signal frequency minus an offset of 1% of the signal frequency.

7. The method according to claim 1, wherein said step of calculating an amount of delay comprises:

timing a phase shift delay between an edge of the input signal and a corresponding edge in the delayed input signal;

accumulating the phase shift delay between subsequent sub-sampled edges in the input signal and corresponding sub-sampled edges in the delayed input signal; and averaging the phase shift delay accumulated during a measurement window.

8. The method according to claim 7, further comprising the step of scaling the averaged phase shift delay based on the sub-sample frequency to determine the amount of delay of said delay line.

9. The method according to claim 7, wherein said measurement window comprises a number of sub-sample measurements needed for a complete set of non-duplicative sub-sample measurements of the input and delayed input signals.

10. The method according to claim 7, wherein said measurement window comprises a set of sub-sample measurements starting with an initial sub-sample measurement and continuing to a last sub-sample measurement, said last sub-sample measurement being a measurement just prior to a next sub-sample measurement that would be a same phase as the initial sub-sample measurement.

11. The method according to claim 7, wherein said measurement window comprises a predetermined time interval.

12. The method according to claim 11, wherein said predetermined time interval is compressed to decrease time required to determine said time delay.

13. The method according to claim 11, wherein said predetermined time interval is increased to reduce jitter effects in the measurements.

14. The method according to claim 1, wherein said step of calculating an amount of delay comprises:

timing a phase shift delay between an edge of the input signal and a corresponding edge of the delayed input signal.

15. The method according to claim 14, wherein said step of timing a phase shift delay comprises:

latching a first counter based on the edge of the input signal;

latching a second counter based on the corresponding edge of the delayed input signal; and subtracting a count value of the first latch from a count value of the second latch to determine a phase delay.

16. The method according to claim 9, further comprising the steps of:

summing timed phase shifts between edges of the input signal and corresponding edges of the delayed input signal; and averaging the summed phase shifts; and scaling the averaged summed phase shifts to determine the amount of delay in said delay line.

17. The method according to claim 1, wherein:

said method is embodied in a set of computer instructions stored on a computer readable media;

said computer instructions, when loaded into a computer, cause the computer to perform the steps of said method.

18. The method according to claim 17, wherein said computer instruction are compiled computer instructions stored as an executable program on said computer readable media.

19. The method according to claim 1, wherein said method is embodied in a set of computer readable instructions stored in an electronic signal.

20. A computer readable media and a set of instructions stored by the computer readable media that, when loaded into a computer, cause the computer to perform the steps of:

taking a first sub-sampled measurement of an input signal;

taking a second sub-sampled measurement of the input signal delayed by the delay line; and calculating the amount of delay based on a phase shift of the delayed input signal compared to the input signal wherein the first and second sub-sample measurements are performed at same frequency.

21. An apparatus for determining an amount of delay in a delay line, comprising:

means for taking a first sub-sampled measurement at a sampling frequency of an input signal;

means for taking a second sub-sampled measurement at the sampling frequency of the input signal delayed by the delay line; and means for calculating an amount of delay based on a phase shift of the delayed input signal compared to the input signal.

22. The apparatus according to claim 21, wherein said means of taking first sub-sampled and said means for taking a second sub-sampled measurements are each configured to perform the sub-sampled measurements at a sliding frequency comprising a sub-sampling frequency offset from a frequency of the signal.

23. The apparatus according to claim 21, wherein said means for calculating an amount of delay comprises:

means for timing a phase shift delay between an edge of the input signal and a corresponding edge in the delayed input signal;

means for accumulating the phase shift delay between subsequent sub-sampled edges in the input signal and corresponding sub-sampled edges in the delayed input signal;

means for averaging the phase shift accumulated during a measurement window; and means for scaling the averaged accumulated phase shift based a frequency of the sub-sampled measurements to determine the amount of delay of said delay line.

24. A delay measurement device, comprising:

a first measurement device configured to measure make a first sub-sampled measurement of an input signal;

a second measurement at a same frequency as the first sub-sampled measurement device configured to make a second sub-sampled measurement of the input signal delayed by a delay line; and a calculator coupled to each of the first and second measurement devices and configured to calculate an amount of delay of the delay line based on a phase shift of the delayed input signal compared to the input signal.

25. The delay measurement device according to claim 24, further comprising a signal generator configured to produce the input signal.

26. The delay measurement device according to claim 25, wherein the signal generator comprises a clock.

27. The delay measurement device according to claim 24, wherein:

said calculator comprises, a timing device configured to determine delay between an edge of the input signal and an edge of the delayed input signal based on the first and second sub-sampled measurement;

an averager configured to average delays between edges of the input signal and corresponding edges of the delayed input signal; and a scaling device configured to scale the averaged delays based on the sliding frequency to determine the amount of delay in said delay line.

28. The delay measurement device according to claim 24, further comprising a sampling signal generator configured to produce a sampling clock at a sub-sampling rate in which to initiate measurements of the first and second sub-sample measurements;

wherein the sub-sampling rate is an offset fraction of the input signal.

29. The delay measurement device according to claim 24, wherein the first measurement device is a flip flop clocked by the sampling signal generator and having the input signal as an input.

30. The delay measurement device according to claim 27, wherein said timing device comprises:

a counter;

an input signal latch fed by the counter and clocked by a predetermined value of the input signal;

a delayed input signal latch fed by the counter and clocked when the delayed input signal is at the predetermined value; and a subtractor configured to determine a phase delay comprising a difference between the input signal latch and the delayed input signal latch when each latch contains counts latched by corresponding edges in the input signal and delayed input signal.

31. The delay measurement device according to claim 24, wherein:

the first measurement device, the second measurement device, and the processing unit together comprise a measurement set; and said delay measurement device further comprising, a plurality of measurement sets, each measurement set performing at least one sub-sampled measurement at a point offset from sub-sampled measurements of other measurement sets; and an averager configured to average the phase delays calculated by the calculators a combinatorial device configured calculator coupled to each of the first and second measurement devices and configured to calculate an amount of delay of the delay line based on a phase shift of the delayed input signal compared to the input signal.

32. A method, comprising:

subsampling an input signal at an undersample frequency;

subsampling a delayed signal at the undersample frequency, wherein the delayed signal is the input signal after being delayed by a delay line;

determining a phase shift of the delayed signal compared to the input signal; and calculating an amount of delay in the delay line based only on the input signal and the phase shift of the delayed signal;

wherein the undersample frequency comprises a sliding frequency that prevents subsamples from repeating a same phase subsample.

33. The method according to claim 1, wherein the undersample frequency comprises a fraction of a frequency of the input signal plus an offset.

34. A device, comprising:

a first subsample mechanism at an undersample frequency configured to take subsamples of an input signal;

a second subsample mechanism at the undersample frequency configured to take subsamples of a delayed signal, wherein the delayed signal is the input signal after a delay; and a delay calculator configured to utilize the subsamples of the first signal and the subsamples of the delayed signal to determine a phase shift between the input signal and the delayed signal and utilize the phase shift to determine an amount of the delay.

35. The device according to claim 34, wherein the first and second subsample mechanisms are each configured to take the subsamples at an under-sampling frequency.

36. The device according to claim 35, wherein the under-sampling frequency comprises a sliding window that keeps the subsamples from repeating a same phase measurement.

* * * * *